United States Patent [19]

Kelly

[11] Patent Number: 5,070,895

[45] Date of Patent: Dec. 10, 1991

[54] METHOD AND APPARATUS FOR EMERGENCY ACTIVATION OR DEACTIVATION OF WATER SUPPLY

[76] Inventor: Terence M. Kelly, P.O. Box 935, Carnelian Bay, Calif. 95711

[21] Appl. No.: 603,806

[22] Filed: Oct. 25, 1990

[51] Int. Cl.⁵ .............................................. F16L 5/00
[52] U.S. Cl. ...................................... 137/1; 137/368; 137/559
[58] Field of Search ............... 137/363, 364, 368, 559, 137/1

[56] References Cited

U.S. PATENT DOCUMENTS

| | | | |
|---|---|---|---|
| 502,349 | 8/1893 | Cornog | 137/363 |
| 1,894,381 | 1/1933 | Markle | 137/364 |
| 2,184,516 | 12/1939 | Coster | 137/364 |

Primary Examiner—A. Michael Chambers
Attorney, Agent, or Firm—Herbert C. Schulze

[57] ABSTRACT

A method and an apparatus to be used in performing said method, wherein easy cut-off, or de-activation, of a water supply to a residence, or the like, and turn-on, or re-activation, of a turned off water supply may be easily accomplished by an unskilled person, particularly in emergencies such as freezing weather, earthquakes, fires, or other emergency situations. The method involves installation of a special shut-off valve with an extension and a properly labeled guide plate incorporated within the system together with a comprehensive set of references, and cross-references, maintained at a central location as well as in the particular individual establishment.

7 Claims, 4 Drawing Sheets

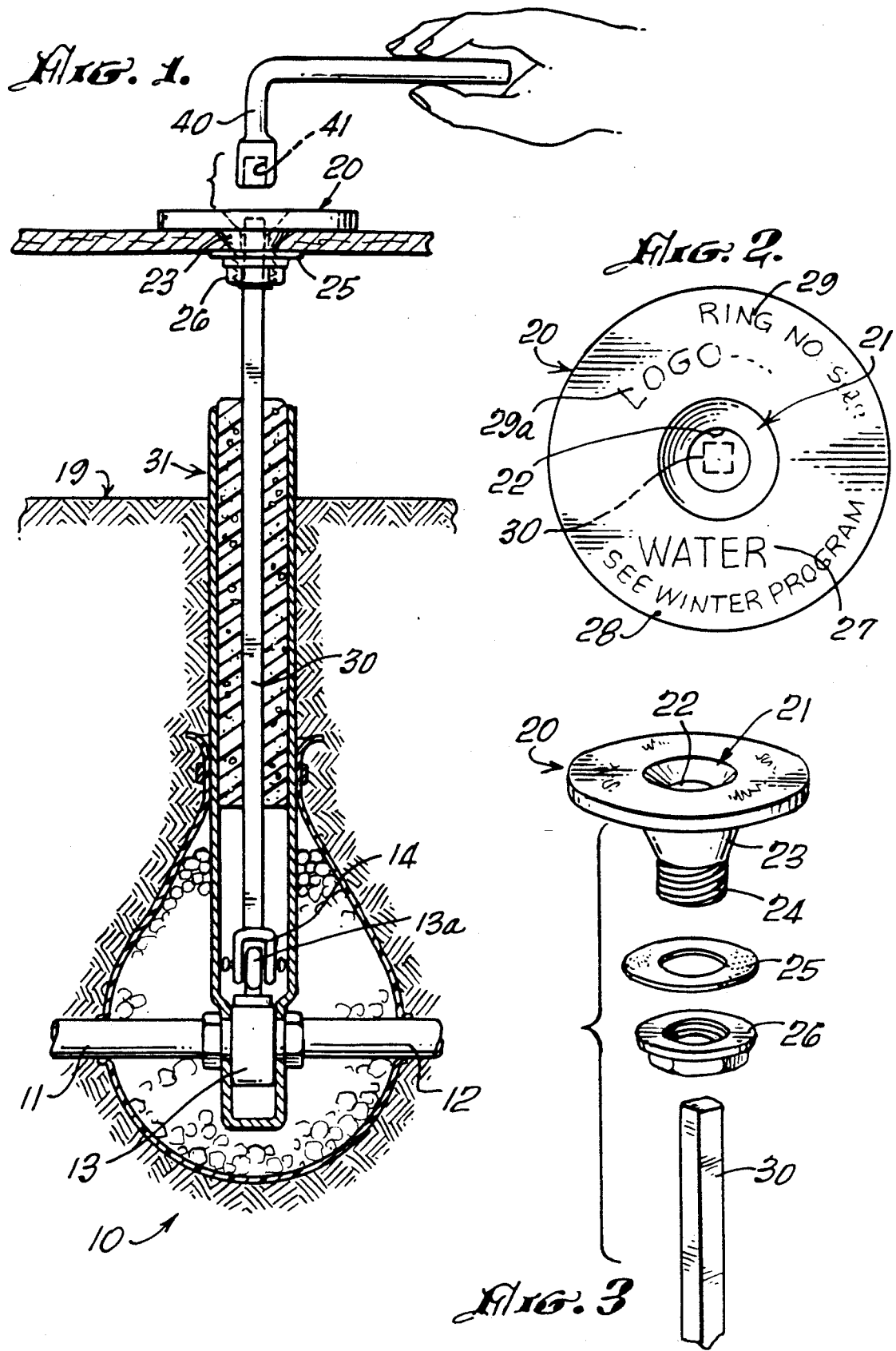

*Fig. 4.*

MEJL PLUMBING FILE NO.
(FLOOR CUT-OFF VALVE)
SER. NO.

OWNER
- NAME
- ADDRESS
- PHONE

PROPERTY
- LOCATION
- CITY
- SUBDIVISION
- PARCEL LOT
- PHONE

MANAGEMENT
- COMPANY
- MAIL ADD.
- PHYS ADD.
- PHONE
- FAX

UTILITIES
- WATER
- ELECTRIC
- GAS
- MISCL

WINTERIZING PROGRAM
1.
2.
3.
4.
5.
6.
7.
8.
9.

ACTIVATION PROGRAM
1.
2.
3.
4.
5.
6.
7.
8.
9.

METHOD AND APPARATUS FOR EMERGENCY ACTIVATION OR DEACTIVATION OF WATER SUPPLY

CROSS REFERENCE TO RELATED PATENT APPLICATIONS

There are no patent applications filed by me related to the within application.

BACKGROUND OF THE INVENTION

1. Field Of The Invention

This invention is in the general field of water supply systems. The invention is more particularly related to a method and apparatus for activating or de-activating water supply to a particular location. It is more particularly directed to such a method in case of emergency situations. The invention is even more particularly related to such a system as heretofore set forth wherein a master control record is maintained in a central location, such as that of a professional plumber or the like.

2. Description Of The Prior Art

There is no prior art known to me utilizing the method of indexing and cross-indexing information as well as installing a special cut-off and informative valve plate which can be interrupted and used by any unskilled person.

SUMMARY OF THE INVENTION

In general, every individual residential or commercial location will have a water supply from a central water location, such as municipal or a public utility company. The water supply to each individual unit is generally activated at all times while the unit is being used for its normal purposes. It frequently becomes necessary, however, to turn off the water supply.

The reasons for turning off a water supply are varied. It can include emergency circumstances such as freezing weather wherein water pipes burst, earthquakes wherein water pipes are ruptured, fire resulting in rupturing of water pipes, installation of appliances, or normal repairs, and the like.

In emergency situations, the occupants of any particular unit which has water service may have no idea concerning the location of shut-off valves or the like. Most frequently such valves will be at a meter some distance from the structure or some other remote location. This can result in very serious consequences in the event of destruction, or partial destruction of plumbing facilities within a structure.

I have studied this problem at length and have now conceived and developed a method, and an apparatus for utilizing the method, in which any occupant of a structure can have immediately available total and complete instructions and records to allow for easy access to, and activation, or de-activation, of means to interrupt the water supply to particular location.

The method by which I accomplish this is to provide a special cut-off valve in a water supply at a relatively convenient location, preferably exterior of and beneath the structure. Normally this cut-off will be below ground level and I have provided an extension to floor level with a specially designed identification plate encompassing the activation means for a cut-off valve.

I have then provided an extensive set of instructions and records for the particular shut-off location which can be maintained within any structure being supplied with water and also at a central location such as a professional plumber or the like. The record keeping forms which I have provided are complete and easy to maintain by both a professional plumber and the occupant of a structure.

Thus, at all times, a record of past interruptions of water supply as well as instructions for immediate interruption and easy activation by an unskilled person are readily available.

It is an object of this invention to provide a method and apparatus for activation and de-activation of water supply to a structure;

Another object of this invention is to provide such a method and apparatus wherein both the structure occupant and a professional person may maintain records for easy instruction to emergency personnel or the like;

Another object of this invention is to provide a record of service of the above nature.

The foregoing and other objects and advantages of this invention will become apparent to those skilled in the art upon reading the description of a preferred embodiment, which follows, in conjunction with a review of the appended drawings.

BRIEF DESCRIPTION OF THE DRAWINGS

FIG. 1 is a partially sectioned schematic drawing of the location and elements of an underground water system activation and de-activation apparatus suitable to be used in the method of this invention;

FIG. 1A is an alternate embodiment of a handle for activation and de-activation;

FIG. 2 is a top plan view of an identification -instruction plate utilized in the method of this invention;

FIG. 3 is an exploded view of some of the elements of an apparatus to practice the method of this invention;

FIG. 4 is an illustration of a master record which may be utilized in the method of this invention concerning each individual location;

DESCRIPTION OF A PREFERRED EMBODIMENT

Figure 5:
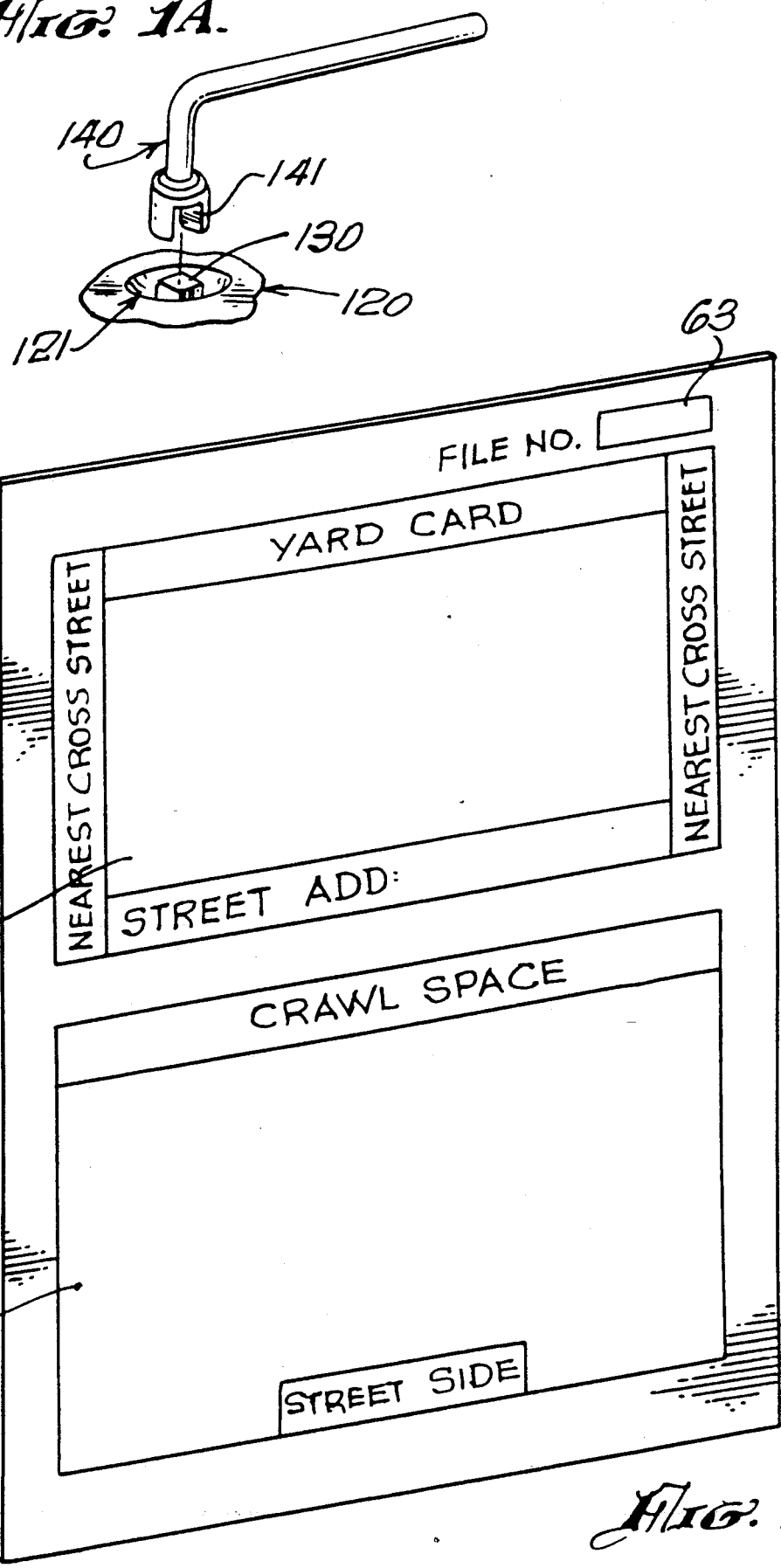
FIG. 5 is an illustration of an instruction card indicating location and other information concerning the particular location concerned.
Figure 6:
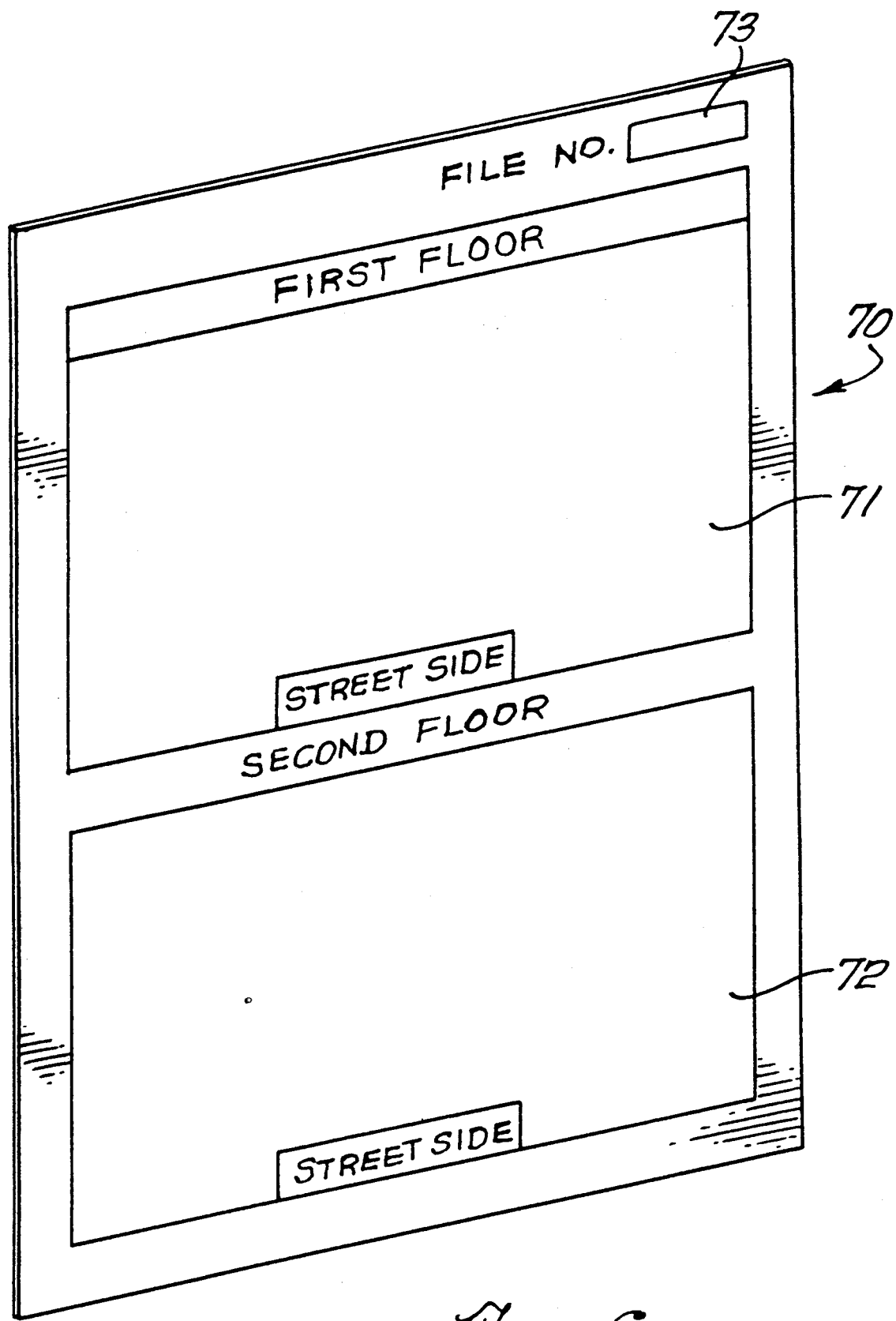
FIG. 6 is a subordinate card indicating information concerning various levels of the structure concerned in using the method of this invention.

The method will be readily understood by those skilled in the plumbing arts upon a careful review of the drawings.

At the outset it must be observed that the method and the apparatus are both quite straight forwarded and relatively simple. The simplicity is the heart of the invention since most persons skilled in the plumbing arts recognize the complexity of plumbing and repairs, particularly in emergency situations. Plumbing contractors, and the like, are called upon repeatedly to respond to emergency situations which would not be an emergency if there had been a simple method as disclosed here to handle what would otherwise be an emergency. Unfortunately, no one has ever before conceived a simple understandable system, method, and apparatus, by which an unskilled person can turn off the water to a structure he is occupying while awaiting the arrival of a skilled professional.

FIG. 1 illustrates in schematic and sectioned view the elements of the physical operation of the method of this invention. The water main and shut-off assemblage generally 10 is shown to be in an opening beneath the surface of the ground 19. It should be understood that the surface of the ground as indicated could be any surface. The ground level 19 could be any level. The water supply line 11 passes through a valve of customary construction 13 in to the service supply for the structure involved 12.

A pipe, or the like, 31 is provided to protect actuating shaft 30 and universal joint 14. The details of universal joint 14 are not shown completely, but from the structure shown anyone skilled in the art can construct a joint to turn the handle 13A of the valve 13.

The shaft 30 may be of any configuration, but preferably is square, hexagon shaped, or some such configuration such that the handle 40 can include a socket 41 to accommodate and activate it. A human hand 50 is utilized to activate the mechanism.

FIG. 1A shows an extremely interesting variation of the handle and is believed to be a sub-invention of its own. In this alternate embodiment, the handle 140 has a slot 141 which will fit properly over a square or rectangular rod 30. The advantage of using a slot in this handle is that this handle could then be used for a variety of other related purposes, such as activating or de-activating other types of meters, many of which have rectangular member which requires the use of a special wrench or special tool, generally not readily available in the ordinary household. This simple wrench then will have a variety of uses and being adaptable both to the special of this invention and for other purposes will be a universal wrench. It will be noted that it is simple in construction and therefore economical. At the same time it is small enough that it does not require some special storage space.

The valve actuation instruction plate 20 is extremely important in this system. It will be noted that there is a tapered area 21 in the center. This culminates in a hole 22 into which extends the shaft 30. On the plate 20 there are various instruction items such as 29 indicating a phone number to obtain information, and indication of whether or not this valve is for water or some other utility (it should be noted that while this is directed to water, which is the most important utilization thereof, it is equally applicable to gas, and under very special circumstances possibly to electricity). Additionally, information is provided as to emergency circumstances involved.

FIG. 3 illustrates the elements already described, but in an exploded view, with additional elements. Those skilled in the art will understand that it will be necessary, or at least desirable, to have a washer 25 and a lock-nut 26 in connection with the other elements which have already been named in order to complete the structure. The insulation 31 is quite important so that cold air will not reach the valve and freeze it.

As an extremely important part of this invention there are a number of very important forms which are used and maintained in the structure and/or other emergency locations. FIG. 1 illustrates a control card 50, wherein information concerning property location 51; owners identification, 52; management (if applicable) information; and other utility information, at 54. At 56 information is provided for specific winterization or other emergency preceding steps which have been undertaken. At 57 there is a report of all activities which have taken place in connection with the program.

At 60, there is generally shown the yard card information. Yard card information involves the professional plumbing or other organization. It gives a street location at 61 including complete details, it includes the file number at 63, and it indicates crawl space or other (such as overhead) space in which service personnel can enter. Also, meters, clean-outs, and other utility information can be provided.

Lastly additional information is provided on card number 70 all of which continues to maintain the appropriate file number at 73 but then adds additional information as necessary as to the ground floor (generally most important) and then subsequent floors 72.

While the foregoing preferred embodiment and variations thereof are fully capable of achieving the objects and advantages desired, it is to be understood that they are for purposes of illustration only and not for purposes of limitation.

I claim:

1. The method for providing information and facility for emergency access to water mains for cutoff and turn on of supply to a structure having a main water supply line comprising: inserting a shutoff valve in the main water supply line at a distance below ground level; inserting a casing in the ground around said valve; attaching an activating means to said valve said activating means being capable of activation and deactivation from a point above ground level; attaching an identifier plate to said casing; marking said identifier plate so as to identify the particular valve location; providing a control record in the form of a chart; identifying the location by entering appropriate information on the control record; activating and deactivating said valve; entering a history of the activation and deactivation of said valve on said control record; providing a first subordinate record; entering location identification and map showing the location of said valve on said first subordinate record; providing a second subordinate record; entering details concerning the water supply to various levels and locations of the structure.

2. The method of claim 1 wherein an elongated rod is attached to said valve and is placed at an area adjacent said identification means; detachably attaching handle means to said rod at a location above ground level.

3. The method of claim 1 wherein insulation is installed within side casing between said valve and identifier plate.

4. The method of claim 1 wherein the valve is installed on a water supply line directly beneath a floor in the structure, and wherein the identifier plate is attached to the floor rather than to the casing.

5. Apparatus for controlling the supply of water to a structure from a water main comprising in cooperative relationship: a valve inserted between said water main and a line to said structure; an activation rod attached to said valve and extending to the surface of the ground; a casing around said activation rod; an identifying plate containing information keyed to the location, which information is reflected on a control record at a central location remote from the location of said valve surrounding an end of said rod adjacent the surface of the ground; a means to activate said rod.

6. The apparatus of claim 5 wherein the casing contains insulation between the valve and the identifying plate, and wherein at least one control record is associated with said identifying plate.

7. Apparatus for controlling supply of water from a water main to plumbing lines within a structure comprising a valve inserted between the water main and the structure plumbing system beneath said structure; a rod connected to said valve and extending through an opening in the floor of said structure; an identifying plate containing information keyed to a record at a remote location surrounding the upper portion of said rod and fastened to the floor records keyed to and identifying said identifying plate and its location located at a location remote from said identifying plate; casing means surrounding said rod from the valve to the floor; actuating handle means detachable from said rod; and insulation surrounding said rod within said casing.

* * * * *